US009366539B2

(12) United States Patent
Zarem et al.

(10) Patent No.: US 9,366,539 B2
(45) Date of Patent: Jun. 14, 2016

(54) INTELLIGENT REVERSE GEOCODING

(71) Applicant: TeleCommunication Systems, Inc., Annapolis, MD (US)

(72) Inventors: Matthew Zarem, Sausalito, CA (US); Eric Vuillermet, SanRafael, CA (US); John Deaguiar, Sebastopol, CA (US)

(73) Assignee: Telecommunications Systems, Inc., Annapolis, MD (US)

( * ) Notice: Subject to any disclaimer, the term of this patent is extended or adjusted under 35 U.S.C. 154(b) by 0 days.

(21) Appl. No.: 14/281,446

(22) Filed: May 19, 2014

(65) Prior Publication Data

US 2014/0297175 A1 Oct. 2, 2014

Related U.S. Application Data

(63) Continuation of application No. 11/367,911, filed on Mar. 3, 2006, now Pat. No. 8,731,585.

(60) Provisional application No. 60/772,086, filed on Feb. 10, 2006.

(51) Int. Cl.
*H04W 24/00* (2009.01)
*G01C 21/26* (2006.01)
*G06T 17/05* (2011.01)
*G09B 29/10* (2006.01)

(52) U.S. Cl.
CPC ............... *G01C 21/26* (2013.01); *G06T 17/05* (2013.01); *G09B 29/106* (2013.01)

(58) Field of Classification Search
CPC ....... G01C 21/26; G06T 17/05; G09B 29/106

USPC ............ 455/456.1–456.6, 457; 701/409–412, 701/455, 461–462, 532
See application file for complete search history.

(56) References Cited

U.S. PATENT DOCUMENTS

| 5,508,707 | A  | 4/1996  | LeBlanc    |
|-----------|----|---------|------------|
| 5,559,707 | A  | 9/1996  | DeLorme    |
| 5,963,866 | A  | 10/1999 | Palamara   |
| 6,091,956 | A  | 7/2000  | Hollenberg |
| 6,282,489 | B1 | 8/2001  | Bellesfield|
| 6,490,522 | B2 | 12/2002 | Sugiyama   |
| 6,498,982 | B2 | 12/2002 | Bellesfield|

(Continued)

FOREIGN PATENT DOCUMENTS

| DE | 19953398 | 5/2001 |
| EP | 1176840  | 1/2002 |

(Continued)

OTHER PUBLICATIONS

"Toyota Prius Navigation," http://www.triliog.org/chilcote/ToyotaPrius/prius-nav.html, 2 webpages downloaded Sep. 28, 2005.

(Continued)

*Primary Examiner* — Wayne Cai
(74) *Attorney, Agent, or Firm* — Tarolli, Sundheim, Covell & Tummino LLP (57) ABSTRACT

Methods and apparatus, including computer program products, for obtaining location information from a location source. A geographic reference point is determined based on accuracy of the location information. The geographic reference point is incorporated into a location result.

8 Claims, 4 Drawing Sheets

(56) References Cited

U.S. PATENT DOCUMENTS

| | | | |
|---|---|---|---|
| 6,510,379 | B1 | 1/2003 | Hasegawa |
| 6,609,005 | B1 | 8/2003 | Chern |
| 6,810,323 | B1 | 10/2004 | Bullock |
| 6,868,410 | B2 | 3/2005 | Fortin |
| 7,039,640 | B2 | 5/2006 | Miller |
| 7,110,773 | B1 | 9/2006 | Wallace |
| 7,113,795 | B2 | 9/2006 | Somani |
| 7,274,378 | B2 | 9/2007 | McAvoy |
| 7,286,931 | B2 | 10/2007 | Kawasaki |
| 7,440,875 | B2* | 10/2008 | Cuthbert et al. ............ 703/2 |
| 7,899,468 | B2 | 3/2011 | Lohtia |
| 2002/0065604 | A1 | 5/2002 | Sekiyama |
| 2002/0072848 | A1 | 6/2002 | Hamada |
| 2002/0173905 | A1 | 11/2002 | Jin |
| 2003/0096620 | A1 | 5/2003 | Ozturk |
| 2003/0114171 | A1 | 6/2003 | Miyamoto |
| 2003/0125042 | A1 | 7/2003 | Olrik |
| 2003/0157942 | A1 | 8/2003 | Osmo |
| 2004/0103157 | A1 | 5/2004 | Requena |
| 2004/0132465 | A1 | 7/2004 | Mattila |
| 2004/0198386 | A1 | 10/2004 | Dupray |
| 2004/0198397 | A1 | 10/2004 | Weiss |
| 2004/0203866 | A1 | 10/2004 | Sahinoglu |
| 2004/0203903 | A1 | 10/2004 | Wilson |
| 2004/0229601 | A1 | 11/2004 | Zabawskyj |
| 2004/0260465 | A1* | 12/2004 | Tu ........................ 701/209 |
| 2005/0037748 | A1 | 2/2005 | Sawano |
| 2005/0049785 | A1 | 3/2005 | Vergin |
| 2005/0137994 | A1 | 6/2005 | Fortin |
| 2005/0143097 | A1 | 6/2005 | Wilson |
| 2005/0181810 | A1 | 8/2005 | Camp |
| 2005/0249172 | A1 | 11/2005 | Malik |
| 2005/0261822 | A1 | 11/2005 | Wako |
| 2005/0288036 | A1 | 12/2005 | Brewer |
| 2005/0288859 | A1 | 12/2005 | Golding |
| 2006/0069504 | A1* | 3/2006 | Bradley et al. ............ 701/211 |
| 2006/0077918 | A1 | 4/2006 | Mao |
| 2006/0099969 | A1 | 5/2006 | Staton |
| 2006/0245572 | A1* | 11/2006 | Asher et al. ............ 379/220.01 |
| 2006/0247855 | A1 | 11/2006 | De Silva |
| 2006/0259237 | A1 | 11/2006 | De Silva |
| 2006/0265737 | A1 | 11/2006 | Morris |
| 2006/0287810 | A1* | 12/2006 | Sadri et al. ............ 701/200 |
| 2007/0061073 | A1 | 3/2007 | Kuo |

FOREIGN PATENT DOCUMENTS

| | | |
|---|---|---|
| EP | 1239392 | 9/2002 |
| GB | 2363289 | 12/2001 |

OTHER PUBLICATIONS

"Yahoo! Maps," http://www.maps/yahoo.com/maps_result?name+&addr+500+Arguello+S . . . , 1 webpage, downloaded Sep. 28, 2005.

"Google Maps," http://maps.google.com/,, web page, downloaded Sep. 28, 2005.

"Magellan Road Mate 760 North America," http://www.magellangps.com/en/products/product.asp?PRODID_1091, 3 webpages, downloaded Sep. 28, 2005.

"Yahoo! Driving Directions," http://maps.yahoo.com/pdd?ed-W.rUOOV.wil_AVMN@66F518pW . . . , 2 webpages, downloaded Sep. 28, 2005.

U.S. Patent Appl. Entitled "Landmark Enhanced Directions," U.S. Appl. No. 11/241,540, filed Sep. 30, 2005.

U.S. Patent Appl. Entitled "Intelligent Reverse Geocoding," U.S. Appl. No. 11/367,911, filed Mar. 3, 2006.

U.S. Patent Appl. Entitled "Personal Location Code," U.S. Appl. No. 11/462,023, filed Aug. 2, 2006.

U.S. Patent Appl. No. Entitled "Personal Location Code Breaker," U.S. Appl. No. 11/462,015, filed Aug. 2, 2006.

Lin et al., "Exploiting a Search Engine to Develop More Flexible Web Agents," Web Intelligence, 2003, IEEE/WIC International Conference on Oct. 13, 2003, pp. 54-60.

International Search Report and Written Opinion from International Appl. No. PCT/US2007/061945 dated Jul. 17, 2007.

International Search Report and Written Opinion from International Appl. No. PCT/US2006/038544 dated Jan. 31, 2007.

International Search Report and Written Opinion from International Appl. No. PCT/US2007/069181 dated Nov. 9, 2007.

International Search Report and Written Opinion from International Appl. No. PCT/US2007/75130 dated Jun. 27, 2008.

International Search Report and Written Opinion from International Appl. No. PCT/US2007/75123 dated Sep. 3, 2008.

Communication Pursuant to Article 94(3) EPC received in European Appl. No. 06 816 086.0-1236 dated Mar. 10, 2008.

Office Action for European Patent Application No. 06816086.0, dated Oct. 31, 2008.

U.S. Patent Application entitled "Location Sensitive Messaging," U.S. Appl. No. 11/437,041, filed May 19, 2006.

* cited by examiner

INTELLIGENT REVERSE GEOCODING

CROSS REFERENCE TO RELATED APPLICATIONS

This application is a continuation of U.S. application Ser. No. 11/367,911, filed Mar. 3, 2006, entitled "Intelligent Reverse Geocoding", now U.S. Pat. No. 8,731,585; which claims priority to U.S. Provisional Application Ser. No. 60/772,086, entitled "Intelligent Reverse Geocoding", filed on Feb. 10, 2006, the entire contents of both of which are hereby incorporated by reference.

BACKGROUND

Conventional reverse geocoding typically can involve analyzing a street network model in order to associate a latitude and longitude coordinate of a mobile device (e.g., a mobile telephone, a personal digital assistant, a wrist watch, an offender ankle bracelet or other suitable device) with the nearest road segment. Nearby road segments are commonly returned in the form of a human recognizable address. Because of factors such as poor signal coverage, limited exposure to open skies for satellite reads, and the amount of movement of a mobile device, there may be an unacceptable level of uncertainty (i.e., error tolerance) associated with the mobile device's coordinate. For example, a parent using a "child finder" application may be told by the application that their child is at a specific address when in reality there is a +/−800 yard inaccuracy associated with the original coordinate information used in the reverse geocoding process.

Typical cellular network operators can use various approaches for determining the location of a mobile device, depending on the information that is available. One high accuracy approach actives a Global Positioning System (GPS) receiver in the mobile device in order to develop a reasonably precise location of the mobile device at a point in time. Another low accuracy approach maps a cellular tower that a mobile device is using (e.g., based on signal strength) to a geographic region. An intermediate approach uses one or more last know GPS location(s) to determine a location of the mobile device based on an estimated trajectory.

Figure 1A:
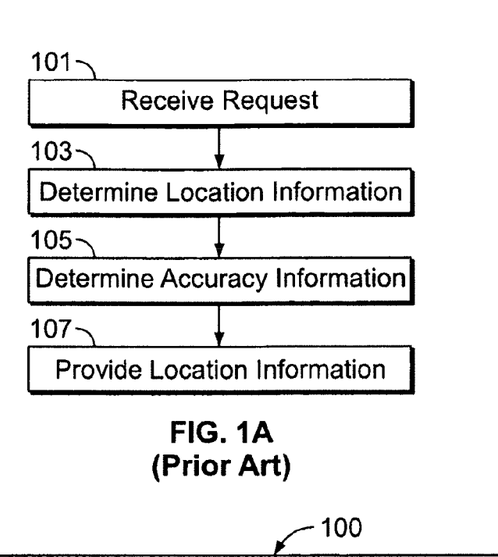
FIG. 1a is a flow diagram describing obtaining and providing location information in the prior art.

FIG. 1a is a flow diagram describing obtaining and providing location information in the prior art. A location source (e.g., a network operator, a web service or other suitable source of location information) receives a request for the location of a mobile device (step 101). For example, the location source can be accessed using the Open Mobility Alliance (OMA) Mobile Location Protocol (MLP). The MLP allows systems to interact with location sources to receive location information as Extensible Markup Language (XML) over Hypertext Transport Protocol {HTTP).

Location information is determined as described above (step 103) and a determination is made as to the accuracy of the location information (step 105). The location information is then provided to the requestor (step 107). The location information can incorporate a shape that defines a geographic area where the mobile device might be located.

Figure 1B:
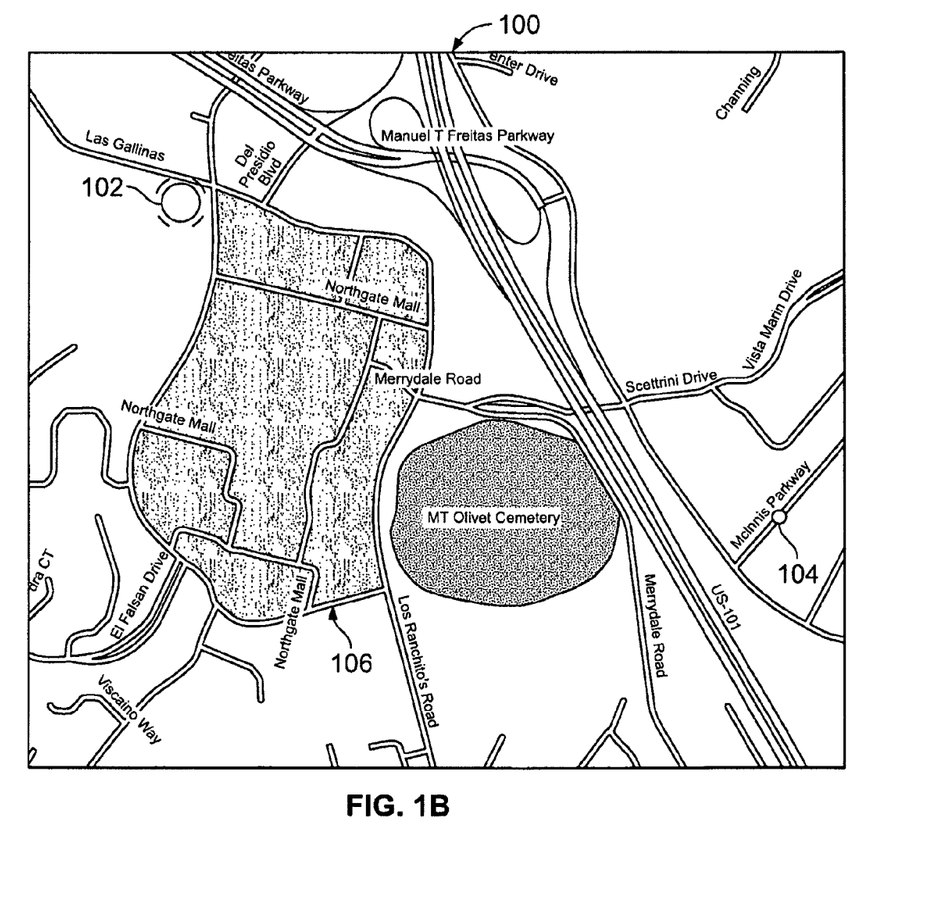
FIG. 1b shows a map indicating the location of a cellular telephone tower and the actual location of a mobile device.

For example, FIG. 1b shows a map 100 indicating the location of a cellular telephone tower 102 and the actual location of a mobile device 104. The mobile device can be located by a cellular telephone network using, for example, approaches as described above. If the mobile device's location is exactly known or is known with a high degree of accuracy, it can provided to a requestor as a definite address. For example:
111 Mcinnis Pkwy
San Rafael, Calif. 94903

However, if the location of the mobile device cannot be accurately determined, e.g., the mobile device's location is somewhere within a two mile radius (i.e., a shape) surrounding the cellular tower 102, the location information provided to the requestor in step 107 is vague. For example, the location information might be the nearest street address to the wireless network cellular tower 102 serving the mobile device at the time of the location request:
[700-900] Las Gallinas Ave.
San Rafael, Calif. 94903

But this location is about one mile across town from the building where the mobile device is actually located (104). Given the fact that a significant and recognizable landmark (i.e., shopping mall 106) is within the shape, a more relevant location could have been provided such as, "Within 3 miles of Northgate Mall, San Rafael, Calif."

SUMMARY

In one general aspect, the techniques feature obtaining location information from a location source. A geographic reference point is determined based on accuracy of the location information. The geographic reference point is incorporated into a location result.

The invention can be implemented to include me or more of the following advantageous features. The location information incorporates a shape corresponding to a geographic area. The shape is associated with a location specifying a geographic position within the shape. The geographic reference point is in proximity to or enclosing the location. The geographic reference point is one of a civic address, a road intersection or a point of interest. Determining the geographic reference point includes determining the proximity of the location to a road segment. The location result includes an indication of distance between the geographic reference point and the location. The location is the center of the area. The point of interest is a landmark, a shopping center, a business establishment, a park, a sports facility, a wilderness area, a recreational area, or a geographic area. The accuracy is inversely proportional to a size of the shape.

In another general aspect, the techniques feature obtaining location information from a location source. The location information incorporates a shape corresponding to a geographic area. The shape is associated with a location specifying a geographic position within the shape. A location result is selected from a plurality of location results base on a size of the shape and proximity of the location to a geographic reference point. The geographic reference point being one of a civic address, a road intersection or a point of interest.

The invention can be implemented to include one or more of the following advantageous features. The geographic reference point is incorporated into the location result. The geographic reference point is a civic address or a point of interest if the size is beneath a first threshold. The geographic reference point is a road intersection if the size is beneath a second threshold, the second threshold being greater than the first threshold. The geographic reference point is a civic address if the proximity is beneath a first threshold. The geographic reference point is a road intersection if the proximity is beneath a second threshold, the second threshold being greater than the first threshold. The geographic reference point is a point of interest if the proximity is greater than the second threshold.

Incorporating an indication of distance between the geographic reference point and the location into the location result.

Particular embodiments of the invention can be implemented to realize one or more of the following advantages. Location information incorporates accuracy information. Location information can be made more relevant to users by associating a geographic reference point with a location. Location results can be presented to users in graphical user interfaces, text-to-speech interfaces, plain text and short message service. Location results can be incorporated into devices such as navigation systems. Prominent intersections and points of interest can be used as reference points. A location result can incorporate a distance from a geographic reference point. Location results can be selected by scoring alternatives based on the accuracy of location information and proximity to road segments. The location result can be selected by scoring alternatives based on the accuracy of location information, proximity to a road segment, and proximity to a point of interest.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Location information from a location source incorporates a shape (e.g., a circle, an ellipsis, a polygon, unions of these, or other suitable shapes) and, optionally, a location. A shape defines a geographic area in which a mobile device is thought to be located. The location can represent a best guess as to a geographic position in the shape where the mobile device might be located. The smaller the area or size of the shape, the higher the degree of accuracy of the location information. For example, if the shape's area is very small (or non existent), the location may correspond to the true location of the mobile device. In one implementation, the location corresponds to the center of the shape. In another implementation, the location information incorporates a shape but not a location.

TABLE 1

| RULE | LOCATION RESULT | RESULT TO DISPLAY | ACCURACY | ROAD SEGMENT PROXIMITY | SCORE IMPACT |
|---|---|---|---|---|---|
| R1 | At specific location | Civic address | High | very close | Increases as the location's proximity to a road segment increases. |
| R2 | Within distance of intersection | (Prominent) intersection | Medium to Low | medium range | Increases if the intersection is within the shape and close to the location. |
| R3 | At POI | Enclosing area POI | High, medium or low | far | The smaller the shape's area, the higher the score. |
| R4 | Within distance of POI | Closest (prominent) POI | Low | N\A | Increases if the POI is within the shape and close to the location. |

Rules or heuristics can be used to guide determination of a location result based on the location information and one or more additional factors such as the proximity of the location to a geographic reference point such as a road segment, an intersection or a point of interest. (Road segments in a street network model and points of interest can be maintained in one or more databases or other persistent storage and accessed as needed.) For example, a scoring scheme as shown in TABLE 1 can be used to determine the format of a location result, although other schemes and location results are possible. The rule in TABLE 1 yielding the highest score as determined by the rule's score impact will determine which location result is selected. Examples of location results are provided in TABLE 2.

Rules can be triggered based on whether the accuracy of the location information is characterized as either high, medium or low. For example, each accuracy level can require the area of the shape to be beneath a certain threshold. A high accuracy level would require the area to be less than or equal to a value N and the medium accuracy level would require the area to be less than or equal to a value M, where N<M. If the area is not less than or equal to M, the accuracy level would be considered low. Fewer or more accuracy levels are possible, as well as other schemes for determining accuracy levels.

Rules can also be triggered based on whether the proximity of a location to a road segment is considered either very close, medium range, or far. For example, each proximity level can require the distance between the location and the road segment to be beneath a certain threshold. For example, a proximity of "Very close" would be a shorter distance than "medium range," and "medium range" would be a short distance than "far." Fewer or more proximity levels are possible.

If the accuracy of the location information is high and the location is very close to a road segment, rule RI applies. Rule RI's score increases as the location's proximity to a road segment increases. If the location is very close to more than one road segment, the road segment yielding the highest score can be used in the location result.

If the accuracy of the location information is medium to low, and the location's proximity to a road segment is medium range, then rule R2 applies. Rule R2's score increases as the location increases in proximity to an intersection, and further increases if the intersection is within the shape. If the intersection is considered prominent (e.g., based on size of intersection, traffic flow, historical information, or other suitable information), the score can be yet further increased. If the location is in a medium range distance from more than one intersection, the intersection yielding the highest score can be used in the location result.

If the location is within a point of interest (POI) and is far from a road segment, rule R3 applies. A POI can be (without limitation) a landmark, a shopping center, a business establishment, a park, a sports facility, a wilderness area, a recreational area, or a geographic area. Rule R3's score increases as the area of the shape decreases. If the location is far from more than one POI, the POI yielding the highest score can be used in the location result. If the POI is considered prominent (e.g., based on size of POI, traffic flow in proximity to the POI, historical information, or other suitable information), the score can be yet further increased. If the location is in a medium range distance from more than one intersection, the intersection yielding the highest score can be used in the location result.

Finally, if the accuracy of the location information is considered low rule R4 applies by default. Rule R4's score increases if a POI is within the shape and close to the location. The score is further increased if the POI is considered prominent. Again, if there is more than one POI the POI with the highest score can be selected for the location result.

TABLE 1 presents four exemplary rules however fewer rules and more rules are possible. Furthermore, a given location result can be used for more than one rule.

TABLE 2

| LOCATION RESULT | RESULT TO DISPLAY | EXAMPLE OF LOCATION RESULT |
| --- | --- | --- |
| At specific location | Civic address | "At 323 Cole Street, San Francisco, CA" |
| Within distance of intersection | (Prominent) intersection | "Within 1.3 kilometers of Cole St. and Carl St." |
| At POI | Enclosing area POI | "At Davies Medical Ce11ter" |
| Within distance of POI | Closest (prominent) POI | "Within 3 miles of Deboce Park" |

Figure 2:
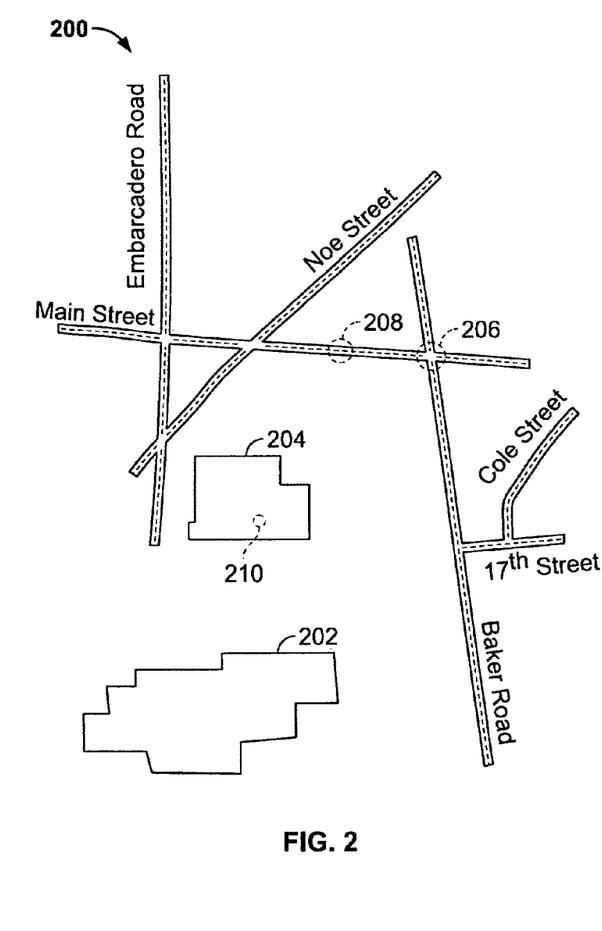
FIG. 2 shows a map including a road network and high accuracy location shapes.

FIG. 2 shows a map 200 including a road network and high accuracy location shapes 206, 208 and 210. Shapes are depicted by dashed lines. For purposes of illustration, the location is assumed to be at the center of a shape for FIGS. 2-4. Shapes 206 and 208 lie on a road segment (Main St.), hence the location result of rule R 1 would be selected. The location result of rule R3 applies to shape 210 since the shape 210 is located at a POI 204.

Figure 3:
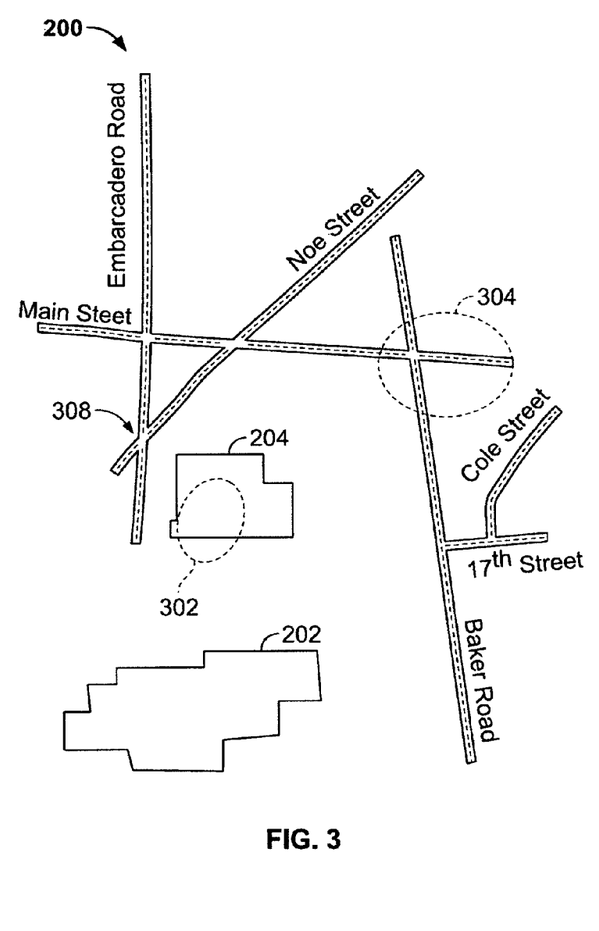
FIG. 3 shows a map including a road network and medium accuracy location shapes.

FIG. 3 shows a map including a road network and medium accuracy location shapes 302 and 304. Since these are medium accuracy shapes, rules R2 and R3 potentially apply. Shape 304 encloses an intersection (Main St. and Baker Rd.), but is some distance from the POI 204. In this circumstance, the location result of rule R2 would could most likely be selected. Shape 302 partially encloses POI 204 but is also surrounded by Embarcadero Rd., Noe St., intersection 308 and, farther away, a POI 202. If the proximity of the location associated with shape 302 to the intersection 308 is considered medium range, for example, rule R2 would be selected over rule R3. However, if the location associated with shape 302 is far from a road segment, then R3 would be selected and POI 204 would be the point of reference used in the location result, since the location is closer to POI 204 than POI 202.

Figure 4:
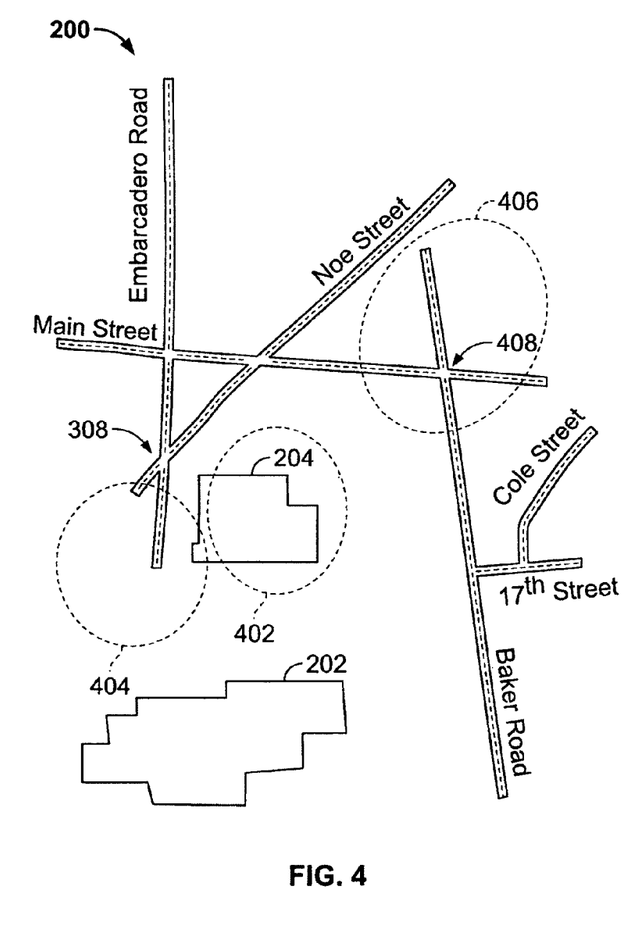
FIG. 4 shows a map including a road network and low accuracy location shapes.

FIG. 4 shows a map including a road network and low accuracy location shapes 402 404, and 406. Shape 402 partially encloses POI 204 and is surrounded by Embarcadero Rd., Noe St., intersection 308 and POI 202. Assuming the location associated with shape 402 is not considered to be far from these roads, rule R2 would apply. Otherwise, rule R3 would apply. Rule R4 can apply by default since the accuracy is low.

Shape 404 is surrounded by POIs 204 and 202, and overlaps with Embarcadero Rd. and Noe St. If the location associated with shape 404 is a medium range distance from the intersection 308, then R2 would apply. R3 does not apply since there no shape enclosing POI. Again rule R4 applies by default.

Shape 406 encloses two road segments, main St. and Baker Rd., which could be considered a medium range or far distance from the location with shape 406, depending on how proximities are defined. If the location is considered to be a medium range distance from a road segment, rule R2 would apply and the location result would include intersection 408. Since there is not an enclosed POI, rule R3 does not apply. Rule R4 would apply by default and have a score dependent on the proximity of the location to the nearest POI (204).

Figure 5:
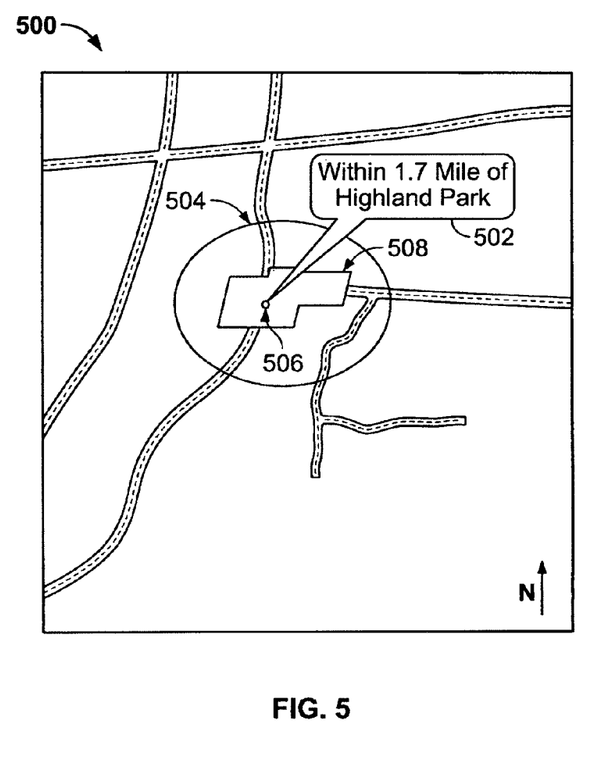
FIG. 5 is an illustration of a graphical user interface incorporating a location result.

FIG. 5 is an illustration of a geographical user interface (GUI) 500 incorporating a location result. The user interface 500 shows a map including a road network and POI 508 (Highland Park). The GUI 500 can be provided on a display device coupled to a personal computer, a portable computer, a personal or automobile navigation system, or a mobile device, for example. In one implementation, GUI is incorporated into an application that allows users to locate mobile devices (and their users), such as a child finder application. Other user interfaces are possible including, without limitation, plain text and short message service (SMS).

In response to a request to present the location of a mobile device (or a person associated with the mobile device), location information is obtained and rules are applied as discussed above to select an appropriate location result to display. Once the location result is selected, it is presented in the GUI 500, such as in call-out window 502. Additionally, the shape 504 can also be displayed, as well as the location 506 (if any). (Based on the format of the location result displayed 502, rule R4 would have been selected.) In this way, users can visually ascertain where a mobile device is located.

In another implementation, the GUI 500 need only display the location result without the accompanying map and shape. In yet a further embodiment, the location result is provided as speech rather than graphically.

Figure 6:
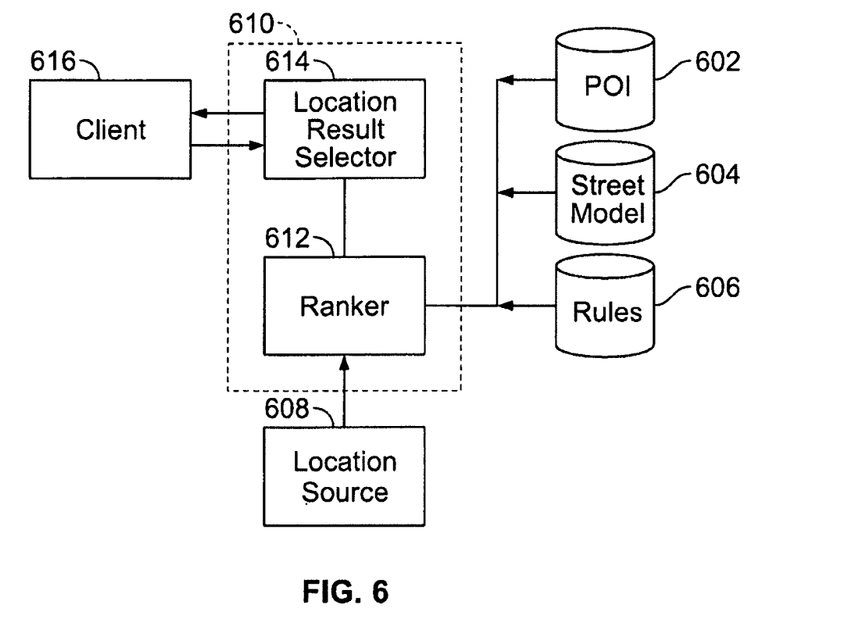
FIG. 6 is a diagram of a system for providing location results.

FIG. 6 is a diagram of a system 600 for providing location results. A location source 608 provides location information to a ranker component 612. The ranker component utilizes rules as described above to determine scores for all possible location results applicable to the location information (i.e., based on the accuracy of the location and, in some cases, the proximity to a nearby road), as described above. The ranker component 612 can utilize a point of interest map database 602 containing points of interest for different geographic regions, a street network model database 604 containing road segments for different geographic regions, and a rules database 606 containing rules, as described above, or receive such data. In one implementation, the ranker component 612 can perform a point and polygon search of a location shape as overlaid on a portion of the network model or point of interest map to determine the proximity of a location to nearby roads and POIs.

From the ranked results a location result is selected by a location result selector component 614. The result selector 614 incorporates location information into the location result as shown in TABLE 2 above and, optionally, provides the location result to a client process 616. The client process 616 could be a process executing on a personal computer connected to the Internet, a mobile device, or a personal or automobile navigation system or other device.

The system 600 may be implemented with more or fewer components. Moreover, components may be distributed on two or more computing devices. In one implementation, the location result selector 614 and the ranker component 612 can form a middleware component 610 whose services can be provided on, for example, a server system. All components, including the client 616, the location service 608, and the databases 602, 604 and 606 can communicate with each other through one or more wired or wireless public or private networks, such as the Internet.

Figure 7:
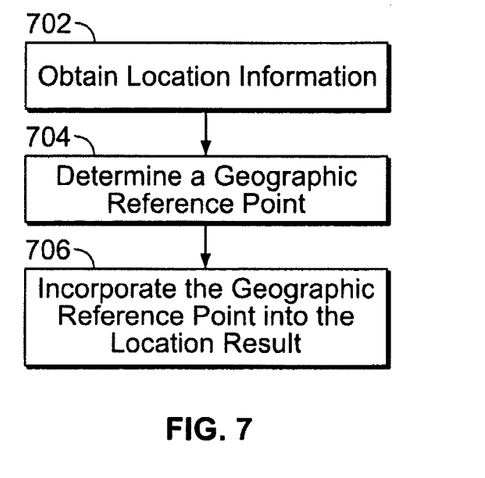
FIG. 7 is a flow diagram describing location result creation.

FIG. 7 is a flow diagram describing location result creation. Location information is obtained from a location source (e.g., 608; step 702). The location information incorporates a shape corresponding to a geographic area. The shape is associated with a location specifying a geographic position within the shape. A geographic reference point in proximity to or enclosing the location is determined based on accuracy of the location information (e.g., 612; step 704). In one implementation, the geographic reference point is one of a civic address, a road intersection or a point of interest. The geographic reference point is incorporated into a location result (e.g., 614; step 706).

Figure 8:
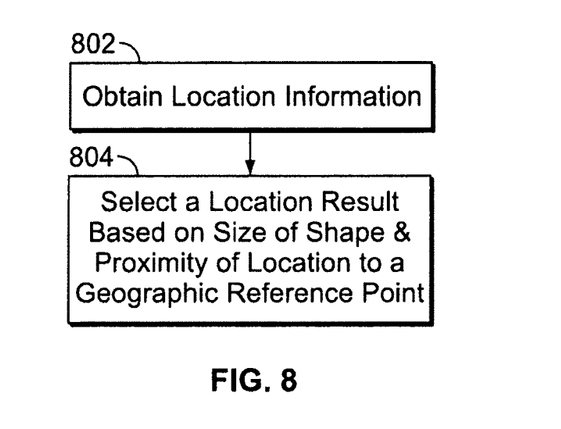
FIG. 8 is another flow diagram describing location result creation.

FIG. 8 is another flow diagram describing location result creation. Location information is obtained from a location source (e.g., 608; step 802). The location information incorporates a shape corresponding to a geographic area. The shape is associated with a location specifying a geographic position within the shape. A location result is selected from a plurality of location results based on a size of the shape and proximity of the location to a geographic reference point, the geographic reference point being one of a civic address, a road intersection or a point of interest (e.g., 614; step 804).

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable device, e.g., a machine-readable storage device, storage medium, or memory device, or multiple ones of them; or it can be a tangible machine-readable propagated signal. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file I a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (OPS) receiver, to name just a few. Information carriers suitable for storing computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Particular embodiments of the invention have been described. Other embodiments are within the scope of the following claims. For example, the actions recited in the claims can be performed in a different order and still achieve desirable results.

What is claimed is:

1. A location server system, comprising:
    a ranker to receive current location information from a physical wireless device;
    a point of interest map database, in communication with said ranker, to provide said ranker with a point of interest within a geographic region including said current location;
    a street network model database, in communication with said ranker, to provide said ranker with a closest road segment within said geographic region; and
    a civic address database, in communication with said ranker, to provide said ranker with a closest civic address within said geographic region;
    wherein said ranker adjusts an accuracy of said current location by incorporating into said current location a closest geographic reference point selected from among said closest point of interest, said closest road segment, and said closest civic address; and
    wherein a size of an icon on a mapped display indicating said current location is adjusted based on said adjusted accuracy of said current location.

2. The location server system according to claim 1, wherein said closest geographic reference point comprises:
    a nearby road segment.

3. The location server system according to claim 1, wherein said closest geographic reference point comprises:
    a point of interest (POI).

4. The location server system according to claim 3, wherein:
    said ranker determines said closest geographic reference point based on a point and polygon search of a location shape as overlaid on a point of interest map.

5. The location server system according to claim 1, further comprising:
    a transmitter, in communication with said ranker, to transmit said adjusted-accuracy current location to a client device.

6. The location server system according to claim 5, wherein said client device comprises:
    a mobile device.

7. The location server system according to claim 5, wherein said client device comprises:
    an automobile navigation system.

8. The location server system according to claim 1, further comprising:
    a shape icon determination module to obtain a shape icon representing said adjusted accuracy of said current location of said physical wireless device, said shape icon being sized both according to a degree of accuracy of said current location, and according to a proximity of said current location to said closest geographic reference point.

* * * * *